2,797,238

METHOD FOR PREPARING ORGANIC PHOSPHINODITHIOIC COMPOUNDS

Clark O. Miller, Cleveland, and Casper J. Dorer, Jr., South Euclid, Ohio, assignors to The Lubrizol Corporation, Wickliffe, Ohio, a corporation of Ohio No Drawing. Application January 26, 1954,
Serial No. 406,323

11 Claims. (Cl. 260—500)

This invention relates to organic sulfur- and phosphorus-containing compounds in which two carbon atoms are directly attached to phosphorus; more particularly, it relates to aromatic phosphinodithioic (dithiophosphinic) acids and corresponding salts thereof.

Phosphinodithioic acids have not been articles of commerce heretofore because of the limitations of the known methods of preparation. A few examples of the lower molecular weight phosphinodithioic acids have been prepared by such laboratory methods as the addition of sulfur to phosphinous halide followed by the hydrolysis of the resulting phosphinothioic halides with potassium sulfide. They have also been made in poor yields and purity by the reaction of Grignard reagents with phosphorus sulfides. As a result of this lack of an efficient and inexpensive method of preparation, the phosphinodithioic acids have not been investigated extensively although their potentialities in the production of lubricant additives, insecticides, flotation agents, etc. are manifest.

It is, therefore, an object of this invention to provide an efficient and low-cost method of preparation of the aromatic and substituted aromatic phosphinodithioic acids and their corresponding salts, which process is characterized by high yields from low-cost starting materials and by simplicity of operation. A further object of this invention is to provide new chemical compositions comprising organic phosphinodithioic acids and salts of widely varying molecular weight as starting materials for chemical synthesis.

More particularly, the new chemical compounds of this invention can be defined by the chemical formula:

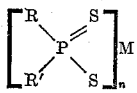

wherein R and R' are the same or different aromatic radicals bonded directly to phosphorus through a benzenoid carbon atom, and having at least one substituent (either organic or inorganic) attached to the aromatic ring, M is either hydrogen or metal and $n$ is the valence of M. The substituents attached to the aromatic ring can be, for example, hydrocarbon, chloro, aryloxy, or thioaryloxy groups. Examples of such compounds include di-(hydrocarbon-substituted aryl) phosphinodithioic acids, di-(chloro-substituted aryl) phosphinodithioic acids, bis-(aryloxy phenyl) phosphinodithioic acids, bis-(thioaryloxy phenyl) phosphinodithioic acids, and the metal salts of the foregoing. Examples of the di-(hydrocarbon-substituted aryl) phosphinodithioates include those in which the radicals, R, R' in the formula above are toluene, capryl benzene, amyl benzene, xylene, ethyl benzene, cumene, naphthalene, biphenyl, anthracene, kerobenzene radicals, and their alkylation products, etc. Examples of the di-(chloro-substituted aryl) phosphinodithioates include those in which R, R' in the formula above are chloro-phenyl, dichloro-phenyl, trichloro-phenyl, etc.

The process of this invention comprises heating and reacting an aromatic compound with a phosphorus sulfide in the presence of aluminum halide as shown in the following equation, wherein X is a halogen:

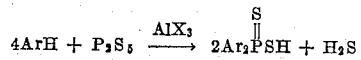

The aromatic compound must be free of reactive functional groups such as —OH, —SH and —NH₂ which are reactive with $P_2S_5$ at low temperatures in the absence of a catalyst. The aromatic compound may be further defined as having an ionization constant of less than $1 \times 10^{-10}$ at 25° C. in aqueous solutions.

By the term "aromatic compound" as used in the specification and appended claims is meant a compound, containing at least one resonating ring structure having at least one nuclear hydrogen atom attached thereto, and devoid of reactive functional groups as defined above. Specific examples of aromatic compounds, including substituted and unsubstituted aromatic hydrocarbons, and including mono- and poly-alkylated and cycloalkylated aromatic nuclei, which are useful as starting materials for the process of this invention include benzene, naphthalene, anthracene, phenanthrene, naphthacene, chrysene, pyrene, triphenylene, biphenyl, terphenyl, etc., and the substitution products of these, for instance, their alkylation products, such as, $C_1$—$C_{30}$ substituted aromatic compounds, halogenation products, nitration products, etc. Examples of substituted aromatic compounds are, toluene, xylene, mesitylene, ethyl benzene, diethyl benzene, isopropyl benzene, n-propyl benzene, di-tert-butyl benzene, isobutyl-benzene, n-butyl benzene, tert-amyl-benzene, cyclohexyl benzene, methylcyclohexyl benzene, caprylbenzene, diisobutyl-benzene, lauryl benzene, cetyl-benzene, paraffin-wax-substituted benzene, nitro-benzene, chloro-benzene, polychloro-benzene, such as, dichlorobenzene and trichlorobenzene, lauroxy-benzene, mono- and poly-chloro-biphenyl, capryl-biphenyl, phenoxy-biphenyl, phenoxy-benzene, thio phenoxy-benzene, diisobutyl-phenoxy-benzene, mono- and poly-chloro-phenanthrene, lauryl phenanthrene, alkylchloro-aromatic hydrocarbons, such as, methyl-monochloro-benzene, methyl polychloro-benzene, and ethyl-monochloro-benzene, alkylnitro-aromatic hydrocarbons, such as, methyl-nitrobenzene, dimethyl-nitro-benzene, ethyl-dinitro-benzene, propyl-nitro-naphthalene, butyl-nitro-phenanthrene, etc. The starting material can comprise a single aromatic compound or mixtures of the aromatic compounds, depending on whether symmetrical or mixed phosphinodithioic acids, respectively, are desired.

The aluminum halides include both aluminum chloride, and aluminum bromide, although aluminum chloride is preferred.

The only phosphorus sulfide contemplated for use in the practice of this invention is $P_2S_5$. The other phosphorus sulfides are unsatisfactory in the process of the invention.

The presence of aluminum halide in the reaction mass of this invention is an essential feature thereof. Without the presence of aluminum halide, the heating of a mixture of an aromatic compound and $P_2S_5$ either fails to cause any substantial reaction to occur or yields only a resinous mass which to our knowledge cannot be treated so as to yield a substantial amount of pure organic phosphinodithioic acid. The addition of aluminum halide, however, prior to heating said mixture, causes the reaction to produce substantial amounts, which in some instances are essentially quantitative, of organic phosphinodithioic acid. Other metal salts such as stannic chloride, zinc chloride, boron trifluoride, ferric chloride, etc. can also be present in the reaction mass in addition to the aluminum halide without detriment and, in many instances, with benefit to the reaction.

The amounts of aluminum halide which may be employed satisfactorily will depend somewhat upon the particular reactants and conditions employed. It has been found desirable in the case of certain rather unstable aromatic compounds, such as cumene, to hold the reaction temperature at a low value in order to avoid undesirable side reactions. In such cases, and in the case of benzene, when the reaction is carried out at atmospheric pressure which limits the temperature of the reaction to 80° C., it has been found desirable to use four moles of aluminum halide per mole of phosphorus pentasulfide to obtain high yields with reasonable reaction times. With fairly stable aromatic compounds where temperatures ranging from 100°–150° C. can be used without undesirable side reactions similar results can be obtained with two moles of aluminum halide per mole of phosphorus pentasulfide. At even high temperatures, lesser amounts of aluminum halide may be used but usually only at the expense of yield of pure organic phosphinodithioic acid. In most instances the minimum amount of aluminum halide which is used will be between one and two moles per mole of phosphorus pentasulfide. However, only as much aluminum halide should be used as is necessary to obtain the maximum yield of product. Except for considerations of economy, there is no disadvantage attending the use of an amount of aluminum halide in excess of that found to produce the highest yields.

The aromatic compound employed as a starting material should be used in an amount, at least equal to four moles per mole of phosphorus pentasulfide, as indicated by the stoichiometry of the equation given above. In actual practice of this invention it is preferred to use a substantial excess of the aromatic component as the aluminum halide complexes with the product to form a viscous mass which is difficult to agitate effectively. If it is not desirable to use an excess of the aromatic component, substantially equivalent agitation can be obtained by using an inert solvent to obtain the required fluidity. Where a phosphinodithioic acid having dissimilar organic radicals is desired, at least four moles of a substantially equimolecular mixture of the two selected aromatic compounds whose radicals are desired in the product should be used for each mole of phosphorus pentasulfide.

The process described herein may be carried out in any of at least four ways; e. g., the aromatic compound, phosphorus pentasulfide, and aluminum halide may be mixed at room temperatures, then heated; the aromatic compound and the phosphorus pentasulfide may be mixed, heated to the desired temperature and then treated with aluminum halide; the aluminum halide and phosphorus pentasulfide may be mixed and then added to the heated aromatic compound; or the aromatic compound and aluminum halide may be mixed and heated and the phosphorus pentasulfide added. All of these methods, as well as many obvious variants thereof, are applicable to the practice of this invention. The most convenient practice is as follows.

The phosphorus pentasulfide in a finely divided state is slurried in a two to three volume excess of the aromatic compound and the mixture heated to about 25°–26° C. Powdered anhydrous aluminum halide is added to the agitated slurry as rapidly as is consistent with a modest temperature rise of the mixture due to the exothermic nature of the reaction. Hydrogen sulfide evolution starts with the addition of the first increment of the catalyst and continues at a rate dependent upon the temperature of the reaction. After all of the aluminum halide has been added the temperature can either be held constant or raised to the desired level. As the reaction continues the reaction mixture gradually clears from a slurry to a clear greenish solution with continued evolution of hydrogen sulfide. Heating and stirring should be continued until the rate of hydrogen sulfide evolution has decreased markedly or until the theoretical amount has been evolved.

Generally the process of this invention is carried out at temperatures within the range of about 25° C. to about 300° C. with the preferred range being about 60°–210° C. The period of heating ranges from about one hour to twenty or more hours depending upon the aromatic compound and the temperatures use. Prolonged heating beyond that necessary to complete the reaction does not appear to decrease the yields when stable aromatic compounds are used.

The process may be carried out not only under atmospheric pressures, but also under subatmospheric or superatmospheric pressures. Subatmospheric pressures afford the advantage of removing the by-product hydrogen sulfide as it is formed, thus causing the reaction to proceed at a faster rate. Superatmospheric pressures are advantageous in that they allow reactions involving volatile aromatic compounds to be carried out at higher temperatures than are feasible at atmospheric pressure.

Further processing of the reaction mass following the completion of the reaction involves treating with a polar material to break the aluminum halide complex and free the organic phosphinodithioic acid. The reaction mixture is allowed to cool and then poured or pumped into a well-agitated bath of cold water, ice, or ice plus a dilute mineral acid. This water-treated mass separates into two liquid layers the organic layer consisting of the organic phosphinodithioic acid and the solvent or excess aromatic material. The organic layer is washed with water and the solvent removed under reduced pressure.

The organic phosphinodithioic acid obtained in this manner is often of sufficient purity without further treatment. The lower molecular weight acids are often crystalline and may be further purified by recrystallization from benzene or alcohol. Another satisfactory method of purifying the acids is to react them with dilute solutions of alkalis, extract the resulting water solutions of the salts with benzene or other immiscible solvent and then regenerate the acids from the water solution of their salts with hydrochloric acid. On regeneration from the water solution of the salts, the acids usually separate as a viscous lower layer of excellent purity. This method is, of course, not applicable to organic phosphinodithioic acids with large organic groups as the alkali salts of these acids have an appreciable solubility in organic solvents and very stable emulsions result.

The salts of the organic phosphinodithioic acids of this invention can be prepared by the usual salt-forming reactions. The metals which form suitable salts include both the light and heavy metals, for example, the alkaline earth metals, magnesium, zinc, cadmium, copper, iron, lead, chromium, etc. For many uses, certain salts will be preferred. Thus, the zinc and barium salts, and particularly the barium salts of organic phosphinodithioic acids are preferred for use in lubricating compositions.

Various specific embodiments of the invention as broadly defined above are included hereinafter for purposes of illustration only, and are not to be construed as limiting the invention in any way.

*Example 1*

A mechanically agitated mixture of 4680 grams (60 moles) of benzene and 1887 grams (8.5 moles) of phosphorus pentasulfide was warmed to 65° C., then treated portionwise over a period of four hours with 4566 grams (34 moles) of aluminum chloride. The temperature was maintained in the range of 80°–90° C. throughout the addition of aluminum chloride, and for an additional ten hours. The reaction mixture was allowed to cool slightly, then it was poured into an excess of ice. This resulting mixture was stirred until the ice had melted completely, and then it was extracted with 2400 grams of benzene. This benzene extract was evaporated to a green syrupy residue (87% yield based on $P_2S_5$) which crystallized on standing and was shown by analysis to have a sulfur content of 25.4 percent (theory, 25.6 percent) and a phosphorus content of 12.1 percent (theory, 12.4 percent); and its identity as diphenylphosphinodithioic acid thus was indicated. This product was characterized further via oxidative conversion to diphenylphosphinic acid as follows:

1068 grams of the above product was dissolved in an equal weight of benzene and the benzene solution was added portionwise with good stirring to 2133 grams of 6 N nitric acid. The temperature was maintained at 30–40° C. throughout the 5.5 hours required for the addition of all the benzene solution and for an additional hour thereafter. The mixture was filtered and the solid was washed with water and benzene, then dried. The dry solid was identified as diphenylphosphinic acid by its melting point, 190° C., and its phosphorus content of 13.6 percent (theory, 13.8 percent).

*Example 2*

A mechanically agitated mixture of 5460 grams (60 moles) of toluene and 1887 grams (8.5 moles) of phosphorus pentasulfide was heated at reflux temperature (110° C.) while being treated portionwise over a period of four hours with 2270 grams (17 moles) of aluminum chloride. This reaction mixture was stirred for an additional 16 hours at reflux temperature, then it was allowed to cool and was poured into an excess of ice. When the ice had melted the organic layer was separated and evaporated at reduced pressure to a syrupy residue which was shown by analysis to have a sulfur content of 20.8 percent (theory, 23.0 percent) and a phosphorus content of 10.0 percent (theory, 11.2 percent), thus indicating its identity as ditolylphosphinodithioic acid containing 10 percent of unremoved toluene. Corroborative identification was afforded by oxidation of the material to ditolyl phosphinic acid, using 6 normal nitric acid as the oxidizing agent. The ditolylphosphinodithioic acid was characterized by its melting point and elemental analysis; it constituted a yield of 98 percent of the theory, based on phosphorus pentasulfide.

A portion of the crude acid as produced in Example 2 was purified by first reacting the crude acid with a 5% aqueous solution of sodium hydroxide to form a water solution of sodium ditolylphosphinodithioic acid. This water solution was extracted three times with benzene to remove any organic soluble components. The purified salt was then reacidified with hydrochloric acid and the water-insoluble phosphinodithioic acid separated. This acid was recrystallized from naphtha four times. The purified ditolylphosphinodithioic acid prepared in this manner melted at 81–82° C. and had the following analysis:

|  | Theory | Found |
|---|---|---|
| Percent P | 11.1 | 11.1 |
| Percent S | 23.0 | 22.86 |
| Acid Number | 201.0 | 200.5 |

*Example 3*

222 grams (1 mole) of phosphorus pentasulfide and 390 grams (5 moles) of benzene were slurried in an agitated flask. 266 grams (2 moles) of aluminum chloride was added over a one hour period at 50–60° C. The temperature was then raised to the boiling point and benzene was removed as it distilled until the pot temperature reached 130° C. at which time 137 grams of benzene had been removed. This benzene was returned to the reaction mixture through a dropping funnel which introduced it beneath the surface of the reaction mixture which was held at 130° C. The first portion of the benzene recycled through the "hot heel" reacted almost as fast as it was introduced as indicated by the evolution of hydrogen sulfide. Recycle benzene was passed through the reaction mass seven times at the end of which period reaction had ceased as indicated by the decrease of $H_2S$ evolution and the disappearance of solid $P_2S_5$.

The reaction mixture was then cooled and 400 ml. of benzene was added to reduce the viscosity at room temperature and the whole poured into excess ice to hydrolyze the aluminum chloride complex. The organic layer was separated, washed twice with water and filtered. After filtration the excess benzene was removed by vacuum distillation. 406 grams (81.2% of theory) of viscous greenish liquid remained which crystallized in standing and had the following analysis indicating it to be substantially pure diphenylphosphinodithioic acid.

|  | Theory | Found |
|---|---|---|
| Percent S | 25.6 | 24.1 |
| Percent P | 12.4 | 12.0 |

*Example 3–A*

An experiment identical to the example above except that 133 grams (1 mole) of aluminum chloride was used instead of 266 grams (2 moles). On concentrating the organic layer after hydrolysis, 240 grams (48% of theoretical) of product remained. This product had the same physical characteristics and the following analysis:

|  | Theory | Found |
|---|---|---|
| Percent S | 25.6 | 24.2 |
| Percent P | 12.4 | 11.9 |

*Example 4*

A mechanically agitated mixture of 475 grams (2.5 moles) of capryl benzene and 111 grams (½ mole) of phosphorus pentasulfide was warmed to 70° C. whereupon 133.5 grams (1 mole) of aluminum chloride was added portionwise over a one-hour period. The reaction mixture was stirred thereafter at 100–105° C. for an additional nine hours, then filtered to remove unchanged phosphorus pentasulfide. The filtrate was poured into 2000 grams of five percent hydrochloric acid solution and the resulting two layers were separated. This aqueous layer was extracted with 200 grams of benzene and this benzene extract added to the organic fraction. This organic solution was evaporated under diminished pressure to a green-yellow viscous liquid which constitutes a yield of 61 percent of theoretical. It was shown by analysis to have a sulfur content of 13.0 percent (theory, 13.4 percent) and a phosphorus content of 6.5 percent (theory, 6.5 percent), establishing its identity as substantially pure di-(capryl-phenyl) phosphinodithioc acid.

*Example 5*

48 moles (5400 grams) of monochlorobenzene and 8 moles (1780 grams) of $P_2S_5$ were slurried in a 12 liter flask equipped with stirrer and reflux condenser. The mixture was heated to 50° C. 32 moles (4264 grams) of $AlCl_3$ were added over a period of one hour. The temperature was then raised to reflux (132° C.) for five hours. At the end of this period the rate of evolution of $H_2S$ had decreased markedly.

The reaction mass was allowed to cool overnight and poured into about 60 pounds of crushed ice. 1½ gallons of benzene was added and the organic —$H_2O$ mixture agitated for ½ hour. The mixture was then allowed to separate into an organic and an aqueous phase. The organic phase was separated from the aqueous phase and filtered. The benzene and excess mono-chloro-benzenes were then removed by vacuum stripping to 90° C. at 25 mm. Hg. 3720 grams of a dark-green viscous liquid product was obtained which was equivalent to a 73 percent yield (theory 5100 grams). This product crystallized on standing and had the following analysis indicating it to be substantially pure di-(chloro-phenyl) phosphinodithioic acid.

|  | Calculated | Found |
|---|---|---|
| Phosphorus | 9.65 | 9.1 |
| Sulfur | 19.9 | 19.4 |
| Chlorine | 22.1 | 22.2 |

Example 6

A mechanically agitated mixture of 186 grams (1 mole) of diphenyl sulfide and 55.5 grams (0.25 mole) of phosphorus pentasulfide was heated at 100° C. while 67 grams (0.5 mole) of aluminum chloride was added portionwise over a period of one hour. The reaction mixture was heated with continued stirring at this temperature for an additional ten hours. The mixture was poured into 1000 parts of five percent hydrochloric acid solution and this mixture was extracted with 200 parts of benzene. The benzene extract was washed twice with water and then evaporated to 131 grams (55 percent of theoretical) of a viscous, red-brown, liquid which was shown by analysis to have a sulfur content of 25.4 percent (theory, 27.4 percent) and a phosphorus content of 6.4 percent (theory 6.6 percent), thus establishing its identity as substantially pure di-(thiophenoxy-phenyl) phosphinodithioic acid.

Example 7

A mechanically agitated mixture of 592 grams (4 moles) of sec-amyl benzene, 222 grams (1 mole) of phosphorus pentasulfide, 1000 parts of high boiling (100–120° C.) petroleum ether and 534 grams (4 moles) of aluminum chloride was heated at 80–90° C. for five hours, then poured into aqueous hydrochloric acid. The organic layer was separated and washed three times with water, then evaporated at diminished pressure to 519 grams (67 percent of theoretical) of a dark liquid which was shown by analysis to have a sulfur content of 7.2 percent (theory, 7.9 percent) indicating the product to be substantially pure di-(sec-amyl-phenyl) phosphinodithioic acid.

Example 8

A mechanically agitated mixture of 1200 grams of polyalkylated benzene, derived from the alkylation of benzene with chlorinated kerosene, and 166.5 grams (0.75 mole) of phosphorus pentasulfide was treated at room temperature over a period of one hour with 400.5 grams (3 moles) of aluminum chloride. The mixture was heated at 100° C. for an additional three hours, then poured into an excess of ice water. The organic layer was extracted with 1500 parts of benzene and this extract was washed with water, dried over magnesium sulfate and finally evaporated under diminished pressure to 874 grams (66 percent of theoretical) of a dark brown, viscous liquid. This material was shown by analysis to have a sulfur content of 6.9 percent (theory, 7.2 percent) and a phosphorus content of 3.5 percent (theory, 3.5 percent).

Example 9

A mechanically agitated mixture of 4257 parts of capryl naphthalene, 996 grams (4.4 moles) of phosphorus pentasulfide and 2360 grams (17.7 moles) of aluminum chloride was warmed at 100–110° C. for four hours, then poured onto 15000 parts of crushed ice. This mixture was stirred, then extracted with 4000 parts of benzene and the benzene extract was washed several times with water. A portion of the benzene solution was concentrated at 114° C./34 mm. to a viscous residue which was shown by analysis to have a sulfur content of 9.0 percent (theory, 11.1 percent) and a phosphorus content of 4.6 percent (theory, 5.4 percent), indicating the product to be substantially pure di-(capryl-naphthyl) phosphinodithioic acid containing 15–17% of unstripped capryl naphthalene.

Example 10

A mechanically agitated mixture of 368 grams (2.5 moles) of o-dichloro-benzene and 111 grams (0.5 mole) of phosphorus pentasulfide was treated portionwise at 50–72° C. over a period of one hour with 133 grams (1 mole) of aluminum chloride. The mixture was then heated at 100–136° C. for 11 hours and filtered. The filtrate was poured onto 1000 parts of five percent hydrochloric acid and crushed ice, and the organic layer was isolated and washed twice with water. The excess ortho-di-chloro-benzene was removed by vacuum distillation, leaving 120 grams (31 percent of theoretical) of a dark green, liquid, substantially pure bis-(dichloro-phenyl) phosphinodithioic acid, which was shown by analysis to have a chlorine content of 38.7 percent (theory, 36.6 percent).

Example 11

A mechanically agitated mixture of 212 grams (2 moles) of xylene and 266 grams (2 moles) of aluminum chloride was heated at 45–70° C. while 222 grams (1 mole) of phosphorus pentasulfide was added. The mixture was heated at 100–150° C. for six hours, then cooled and poured into an excess of ice and 5 percent hydrochloric acid. The organic layer was isolated and washed with water, then concentrated to a very viscous green liquid substantially pure di-xylyl dithiophosphinic acid, which was shown by analysis to contain 21.2 percent sulfur (theory, 20.0) and 12.0 percent phosphorus (theory, 10.0 percent).

Example 12

A mechanically agitated mixture of 3000 grams (25 moles) of isopropylbenzene and 790 grams (3.6 moles) of phosphorus pentasulfide was treated portionwise at 80° C. over a period of two hours with 475 grams (3.6 moles) of aluminum chloride. The mixture then was heated at 115° C. for eight hours, then at reflux temperature for 12 hours. The cooled product mixture was poured into an excess of ice water and filtered. The organic layer was isolated and concentrated at 110° C./5 mm. to 1455 grams (63 percent of theoretical) of an orange, highly viscous liquid, di-(isopropylphenyl) phosphinodithioic acid, which was shown by analysis to contain 9.3 percent phosphorus (theory, 9.3 percent).

Example 13

To a well-stirred mixture of 600 grams (5.65 moles) of ethyl benzene and 312 grams (1.4 moles) of phosphorus pentasulfide was added portionwise 970 grams (7.3 moles) of aluminum chloride. The mixture was heated at 90° C. for nine hours at slightly reduced pressure to facilitate the removal of evolved hydrogen sulfide. The product mixture was hydrolyzed with water and extracted with benzene. The benzene extract was filtered, then concentrated to 765 grams (89 percent of theoretical) of a green viscous liquid consisting essentially of di-(ethyl-phenyl) phosphinodithioic acid.

Example 14

A mixture of 1258 grams of wax-substituted diphenyl ether, 154 grams of phosphorus pentasulfide and 252 grams of aluminum chloride was stirred for six hours at 160–179° C. The mixture was allowed to cool and then was poured into an excess of ice and dilute hydrochloric acid. The organic portion was extracted with benzene and the benzene extract was dried over anhydrous magnesium sulfate. Concentration of this dried benzene extract yielded 89.5 percent of a foul-smelling, viscous, dark green liquid which was shown by analysis to have a phosphorus content of 3.0 percent (theory, 3.1 percent).

Example 15

A mixture of 200 grams (2.56 moles) of benzene and 60 grams (0.27 mole) of phosphorus pentasulfide was warmed with stirring to 60° C. over a period of 40 minutes, then treated portionwise over a 15-minute period with 284.8 grams (1.07 moles) of aluminum bromide. The mixture became black and there was a copious evolution of hydrogen sulfide. The temperature was maintained at 90° C. (reflux) for two hours whereupon nitrogen was bubbled through the mixture at 80° C. for an hour. The resulting product was poured into a suspension of cracked ice in 250 ml. of benzene, and this mixture stirred vigorously for one hour, the temperature being kept below 10° C. by periodic additions of ice.

To the above hydrolysate, at room temperature there was added with stirring 500 ml. of benzene and 1000 ml. of water. The water layer was removed and the residual benzene layer washed twice with water, then filtered through hyflo. The clear, green filtrate was concentrated by heating to a final temperature of 60° C./20 mm. to yield 100 grams of a dark green liquid having the following analyses:

| | |
|---|---|
| Acid No | 179 |
| Percent P | 11.6 |
| Percent S | 22.9 |

The phosphinodithioic acids, and salts thereof, of this invention can be employed as improving agents in lubricating oils and greases, and particularly for such purposes as producing improved lubricants for use in crankcases of internal combustion jet aviation devices, top cylinder regions, steam cylinders, steam locomotives, railway cars, gas engines, refrigerating machines, and hydraulic compressor, turbine, spindle, and torque converter mechanisms. Other suitable uses are in asphalt emulsions, insecticidal compositions, fireproofing and stabilizing agents in plasticizers and plastics, paint driers, rust inhibiting compositions, pesticides, foaming compositions, cutting oils, metal drawing compositions, flushing oils, textile treatment compositions, tanning assistants, metal cleaning compositions, emulsifying agents, antiseptic cleansing compositions, penetrating agents, gum solvent compositions, fat splitting agents, flotation agents, and improving agents for hydrocarbon fuels etc.

Other modes of applying the principle of the invention may be employed, change being made as regards the details described, provided the features stated in any of the following claims, or the equivalent of such, be employed.

We therefore particularly point out and distinctly claim as our invention:

1. In the process for preparing aromatic phosphinodithioic acids the steps which comprise reacting an aromatic compound having an ionization constant less than $1 \times 10^{-10}$ in water at 25° C., and having at least one hydrogen atom attached to a resonant aromatic ring structure, with $P_2S_5$ in the presence of $AlCl_3$ in amounts such that the ratio of moles of $AlCl_3$ to moles of $P_2S_5$ is at least 1.

2. The process of claim 1 further characterized in that said aromatic compound is an aromatic hydrocarbon substituted aromatic compound.

3. The process of claim 1 further characterized in that said aromatic compound is a chloro substituted aromatic compound.

4. The process of claim 1 further characterized in that said aromatic compound is an alkyl substituted aromatic compound.

5. The process of claim 1 further characterized in that said process mass is treated with a polar solvent and the phosphinodithioic acid separated therefrom.

6. The process of claim 1 further characterized in that said process mass is treated with water and the phosphinodithioic acid separated therefrom.

7. In the process for preparing aromatic phosphinodithioic acids the steps which comprise reacting an aromatic hydrocarbon compound having an ionization constant less than $1 \times 10^{-10}$ in water at 25° C., and having at least one hydrogen atom attached to a resonant aromatic ring structure, with $P_2S_5$ in the presence of $AlCl_3$ in amounts such that the ratio of moles of $AlCl_3$ to moles of $P_2S_5$ is at least 1.

8. The process of claim 7 further characterized in that said process mass is treated with a polar solvent and the phosphinodithioic acid separated therefrom.

9. The process of claim 7 further characterized in that said process mass is treated with water and the phosphinodithioic acid separated therefrom.

10. The method for preparing organic phosphorus acids having at least one carbon to phosphorus bond which comprises simultaneously reacting an aromatic compound having at least one resonating ring structure and at least one nuclear hydrogen atom attached to said resonating ring structure with $P_2S_5$ and $AlCl_3$, said aromatic compound being devoid of reactive functional groups and having an ionization constant less than $1 \times 10^{-10}$ in aqueous solutions at 25° C.

11. In the process for preparing aromatic phosphinodithioic acids the steps which comprise reacting an aromatic compound having an ionization constant less than $1 \times 10^{-10}$ in water at 25° C., and having at least one hydrogen attached to a resonant aromatic ring structure, with $P_2S_5$ in the presence of aluminum halide in amounts such that the ratio of moles of aluminum halide to moles of $P_2S_5$ is at least 1.

References Cited in the file of this patent

UNITED STATES PATENTS

| | | |
|---|---|---|
| 2,316,086 | MacLaren | Apr. 6, 1943 |
| 2,580,430 | Hughes et al. | Jan. 1, 1952 |

OTHER REFERENCES

Malatesta et al.: C. A., vol. 40, page 7039 (1946).
Malatesta et al.: C. A., 41: 2014 (1947).